(12) United States Patent
Iio et al.

(10) Patent No.: US 8,092,880 B2
(45) Date of Patent: Jan. 10, 2012

(54) FUEL HOSE

(75) Inventors: Shinji Iio, Komaki (JP); Kazutaka Katayama, Kasugai (JP); Hiroaki Ito, Kasugai (JP)

(73) Assignee: Tokai Rubber Industries, Ltd., Komaki-shi, Aichi (JP)

( * ) Notice: Subject to any disclaimer, the term of this patent is extended or adjusted under 35 U.S.C. 154(b) by 664 days.

(21) Appl. No.: 11/727,006

(22) Filed: Mar. 23, 2007

(65) Prior Publication Data

US 2007/0248779 A1   Oct. 25, 2007

(30) Foreign Application Priority Data

Mar. 28, 2006   (JP) ................. 2006-089075
Mar. 13, 2007   (JP) ................. 2007-063972
Mar. 22, 2007   (JP) ................. 2007-075075

(51) Int. Cl.
*B32B 1/08*   (2006.01)
*B32B 25/00*   (2006.01)

(52) U.S. Cl. ............ 428/36.9; 428/36.91; 428/36.8; 428/36.7

(58) Field of Classification Search ............ 428/36.91, 428/36.9

See application file for complete search history.

(56) References Cited

U.S. PATENT DOCUMENTS

| 4,830,920 | A  | * | 5/1989  | Hayashi et al.    | 428/421   |
|-----------|----|---|---------|-------------------|-----------|
| 5,260,393 | A  | * | 11/1993 | Arcella et al.    | 526/247   |
| 5,588,469 | A  | * | 12/1996 | Kakiuchi et al.   | 138/137   |
| 5,639,528 | A  | * | 6/1997  | Feit et al.       | 428/36.91 |
| 5,679,425 | A  | * | 10/1997 | Plumley           | 428/35.7  |
| 5,941,286 | A  | * | 8/1999  | Fauble et al.     | 138/137   |
| 6,261,657 | B1 | * | 7/2001  | Ainsworth et al.  | 428/36.91 |
| 6,340,511 | B1 |   | 1/2002  | Kaube et al.      |           |
| 6,467,509 | B1 | * | 10/2002 | Iio et al.        | 138/137   |
| 6,489,420 | B1 | * | 12/2002 | Duchesne et al.   | 526/255   |
| 6,723,400 | B1 | * | 4/2004  | Ishio et al.      | 428/35.7  |
| 6,841,215 | B2 | * | 1/2005  | Kitamura et al.   | 428/36.9  |
| 6,984,697 | B2 | * | 1/2006  | Blong et al.      | 525/200   |
| 7,029,736 | B2 | * | 4/2006  | Ainsworth         | 428/36.91 |
| 7,431,991 | B2 | * | 10/2008 | Verschuere et al. | 428/422   |
| 2002/0006491 | A1 | * | 1/2002  | Ito et al.     | 428/36.91 |
| 2003/0100677 | A1 | * | 5/2003  | Kitamura et al. | 525/109 |
| 2003/0198771 | A1 | * | 10/2003 | Fukushi et al. | 428/36.91 |
| 2004/0142135 | A1 | * | 7/2004  | Verschuere et al. | 428/36.91 |
| 2004/0214916 | A1 | * | 10/2004 | Patel et al. | 523/122 |
| 2005/0208248 | A1 | * | 9/2005  | Ilo et al. | 428/36.91 |
| 2006/0042712 | A1 | * | 3/2006  | Iio et al. | 138/137 |
| 2006/0127619 | A1 | * | 6/2006  | Dimascio | 428/36.91 |
| 2006/0128857 | A1 | * | 6/2006  | Otaka et al. | 524/322 |
| 2007/0231522 | A1 | * | 10/2007 | Sakazaki et al. | 428/36.91 |
| 2008/0230137 | A1 | * | 9/2008  | Sakazaki et al. | 138/137 |

FOREIGN PATENT DOCUMENTS

EP    1096190 A1   5/2001
JP    8-169085 A   7/1996

* cited by examiner

*Primary Examiner* — Rena Dye
*Assistant Examiner* — Michele L Jacobson
(74) *Attorney, Agent, or Firm* — Westerman, Hattori, Daniels & Adrian, LLP

(57) ABSTRACT

A fuel hose includes a laminated structure of a tubular resin layer and an adjoining rubber layer, the rubber layer being formed by a rubber composition containing the following (A) to (F) as essential components, and the resin layer being formed by a material containing a tetrafluoroethylene-hexafluoropropylene-vinylidene fluoride terpolymer or a tetrafluoroethylene-hexafluoropropylene-vinylidene fluoride-perfluoroalkyl vinyl ether quaterpolymer as a main component:

(A) a blend of acrylonitrile-butadiene rubber and polyvinyl chloride;
(B) at least one selected from the group consisting of 1,8-diazabicyclo[5.4.0]undecene-7 salt, 1,5-diazabicyclo[4.3.0]nonene-5 salt, 1,8-diazabicyclo[5.4.0]undecene-7 and 1,5-diazabicyclo[4.3.0]nonene-5;
(C) zeolite;
(D) magnesium oxide;
(E) laminar mineral; and
(F) basic silica.

5 Claims, 1 Drawing Sheet

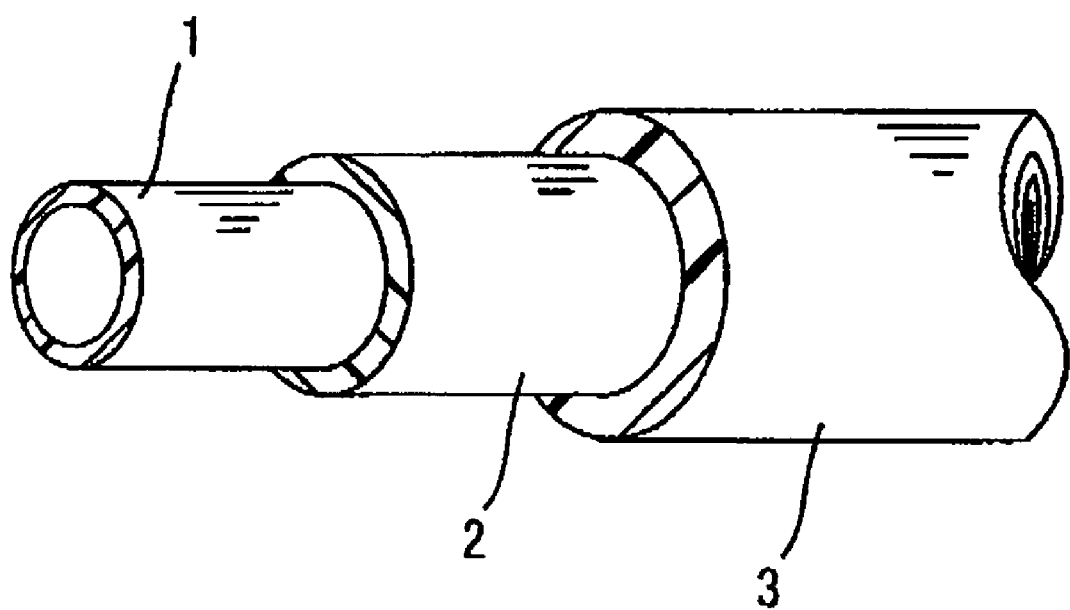
Figure

FUEL HOSE

BACKGROUND OF THE INVENTION

1. Field of the Invention

The present invention relates to a fuel hose for transportation or the like of fuel for automobiles and the like such as gasoline, alcohol-containing gasoline, diesel fuel, FAME (fatty acid methyl ester)-containing diesel fuel, a synthetic fuel-containing diesel fuel (such as GTL (Gas to Liquid)), CNG (Compressed Natural Gas) or LPG (Liquefied Petroleum Gas).

2. Description of the Art

With growing worldwide awareness of environmental issues, the control of the amount of fuel permeation from an automotive fuel hose and the like has been enhanced. Particularly in North America, stringent regulations against fuel permeation are recently coming into effect. Under such a situations a fuel hose has been proposed which has a three-layer structure including an inner layer composed of acrylonitrile-butadiene rubber (NBR), an intermediate layer composed of a tetrafluoroethylene-hexafluoropropylene-vinylidene fluoride terpolymer (THV) and an outer layer composed of NBR-PVC, or which has a four-layer structure including the same inner layer, the same intermediate layer, an outer layer composed of NBR and an outermost layer composed of chlorosulfonated polyethylene rubber (CSM).

However, the layer made of NBR does not adhere well to the layer made of THV. Therefore, a fuel hose having improved interlaminar adhesion between the NBR layer and the THV layer by adding 1,8-diazabicyclo[5.4.0]undecene-7 salt (DBU salt) into the NBR layer has been proposed (see Japanese Unexamined Patent Publication No. 8-169085 (19961).

However, NBR employed as a material for forming the fuel hose as described in the Publication is inferior to a blend of acrylonitrile-butadiene rubber and polyvinyl chloride (NBR-PVC) in fuel-permeation resistance, ozone resistance, sour-gasoline resistance and the like, so that the resulting hose has lower product reliability. Therefore, it is considered that the NBR is replaced by NBR-PVC, excellent in fuel-permeation resistance, ozone resistance, sour-gasoline resistance and the like as a hose material, and also interlaminar adhesion between the NBR-PVC layer and the THV layer is improved by adding DBU salt into the NBR-PVC layer, as mentioned above. However, even if DBU salt is added to the NBR-PVC layer, the interlaminar adhesion between the NBR-PVC layer and the THV layer is not so much improved to the extent that the case where DBU salt is added to the NBR layer.

In view of the foregoing, it is an object of the present invention to provide a fuel hose excellent in fuel permeation resistance and interlaminar adhesion.

SUMMARY OF THE INVENTION

In order to achieve the aforesaid object, according to the present invention, there is provided a fuel hose having a laminated structure of a tubular resin layer and an adjoining rubber layer, the rubber layer being formed by a rubber composition containing the following (A) to (F) as essential components, and the resin layer being formed by a material containing a tetrafluoroethylene-hexafluoropropylene-vinylidene fluoride terpolymer or a tetrafluoroethylene-hexafluoropropylene-vinylidene fluoride-perfluoroalkyl vinyl ether quaterpolymer as a main component:

(A) a blend of acrylonitrile-butadiene rubber and polyvinyl chloride;
(B) at least one selected from the group consisting of 1,8-diazabicyclo[5.4.0]undecene-7 salt, 1,5-diazabicyclo[4.3.0]nonene-5 salt, 1,8-diazabicyclo[5.4.0]undecene-7 and 1,5-diazabicyclo[4.3.0]nonene-5;
(C) zeolite;
(D) magnesium oxide;
(E) laminar mineral; and
(F) basic silica.

The inventors of the present invention conducted intensive studies to obtain a fuel hose excellent in fuel permeation resistance and interlaminar adhesion. As a result, they found that the intended object can be achieved by using a rubber composition containing a blend of acrylonitrile-butadiene rubber and polyvinyl chloride (NBR-PVC), together with either of DBU salt or DBU and either of 1,5-diazabicyclo[4.3.0]nonene-5 salt (DBN salt) or DBN, as well as zeolite, magnesium oxide, laminar mineral and basic silica. Thus, they attained the present invention. It is thought that this is based upon the following reasons. Since the DBU salt or the like is a strong dehydrohalogenating agent, elimination of HCl from PVC in the NBR-PVC layer is prioritized than elimination of HF in the resin layer mainly composed of a tetrafluoroethylene-hexafluoropropylene-vinylidene fluoride terpolymer or a tetrafluoroethylene-hexafluoropropylene-vinylidene fluoride-perfluoroalkyl vinyl ether quaterpolymer, so that interlaminar adhesion between the above-mentioned specific resin layer and the NBR-PVC layer is deteriorated and thus the interfacial peeling is caused. It is thought that, in the present invention, an HCl-catcher such as zeolite, magnesium oxide, laminar mineral and basic silica catches chlorine so as to prevent elimination of HCl from PVC in the NBR-PVC layer and the DBU salt or the like eliminates HF from 2F in the adjoining specific resin layer. It is thought that the remaining part releasing the HF in the resin layer and a double bond of NBR in the NBR-PVC layer are reacted by a vulcanizing agent or the like, so that interlaminar adhesion is improved and thus rubber itself is broken without peeling of the interface in a peeling mode.

In this way, the fuel hose of the preset invention has a laminated structure including the NBR-PVC layer formed by using the NBR-PVC, together with the DBU salt or the like, as well as zeolite, magnesium oxide, laminar mineral and basic silica, and the adjoining specific resin layer. For this reason, interlaminar adhesion therebetween is excellent and thus rubber itself is broken without peeling of the interface in a peeling mode. Further, since NBR is replaced by NBR-PVC, the resulting hose is excellent in fuel-permeation resistance, ozone resistance, sour-gasoline resistance and the like and thus product reliability as a hose is improved.

When a fuel hose of the present invention includes a tubular inner layer, an intermediate layer formed on an outer peripheral surface of the inner layer and an outer layer formed on an outer peripheral surface of the intermediate layer, in which the inner layer and the outer layer are formed by the above-mentioned rubber composition, and the intermediate layer is formed by a material containing a tetrafluoroethylene-hexafluoropropylene-vinylidene fluoride terpolymer or a tetrafluoroethylene-hexafluoropropylene-vinylidene fluoride-perfluoroalkyl vinyl ether quaterpolymer as a main component, each interlaminar adhesion between the inner layer and the intermediate layer and between the intermediate layer and the outer layer is improved, so that interlaminar adhesion of the entire hose becomes good.

When the rubber composition containing the above-mentioned (A) to (F) as essential components further contains the following (G) at not more than 10 parts by weight based on 100 parts by weight of the above-mentioned (A), heat resistance of the hose is improved;
(G) zinc oxide.

BRIEF DESCRIPTION OF THE DRAWING

The sole FIGURE of the drawing is a diagram illustrating the construction of an exemplary automotive fuel hose according to the present invention.

DESCRIPTION OF THE PREFERRED EMBODIMENTS

Embodiments of the present invention will hereinafter be described in detail.

A fuel hose according to the present invention has a laminated structure including a tubular resin layer and an adjoining rubber layer.

According to the present invention, the rubber layer is formed by a rubber composition containing the following (A) to (F) as essential components, and the resin layer is formed by a material containing a tetrafluoroethylene-hexafluoropropylene-vinylidene fluoride terpolymer or a tetrafluoroethylene-hexafluoropropylene-vinylidene fluoride-perfluoroalkyl vinyl ether quaterpolymer as a main component;
(A) a blend of acrylonitrile-butadiene rubber and polyvinyl chloride;
(B) at least one selected from the group consisting of 1,8-diazabicyclo[5.4.0]undecene-7 salt, 1,5-diazabicyclo[4.3.0]nonene-5 salt, 1,8-diazabicyclo[5.4.0]undecene-7 and 1,5-diazabicyclo[4.3.0]nonene-5;
(C) zeolite;
(D) magnesium oxide;
(E) laminar mineral; and
(F) basic silica,
which is the main feature of the present invention.

As shown in the FIGURE, a fuel hose according to one embodiment of the present invention includes, for example, a tubular inner layer 1, an intermediate layer 2 formed on an outer peripheral surface of the inner layer and an outer layer 3 formed on an outer peripheral surface of the intermediate layer, and the inner layer and the outer layer are formed by the above-mentioned rubber material and the intermediate layer is formed by a material of which main component is a tetrafluoroethylene-hexafluoropropylene-vinylidene fluoride terpolymer or a tetrafluoroethylene-hexafluoropropylene-vinylidene fluoride-perfluoroalkyl vinyl ether quaterpolymer.

In the present invention, "main component" typically means a component occupying more than half, and also means a component occupying the entire.

As the material for forming the inner layer 1 (inner layer material) of the present invention and the material for forming the outer layer 3 (outer layer material), a rubber composition including the above-mentioned (A) to (F) as essential components is used.

The blend (NBR-PVC) of acrylonitrile-butadiene rubber (NBR) and polyvinyl chloride (PVC) as the component (A) is not particularly limited. However, the blend ratio by weight of NBR and PVC is preferably NBR/PVC-99/1 to 50/50, particularly preferably NBR/PVC=90/10 to 60/40. Further, the NBR has preferably an acrylonitrile amount (AN amount) of 25 to 60, particularly preferably 31 to 55.

Examples of the component (B) used with the NBR-PVC (component (A)) include 1,8-diazabicyclo[5.4.0]undecene-7 salt (DBU salt), 1,5-diazabicyclo[4.3.0]nonene-5 salt (DBN salt), DBU and DBN, which may be used either alone or in combination.

Examples of 1,8-diazabicyclo[5.4.0]undecene-7 salt (DBU salt) of the component (B) include DBU-naphthoate, DBU-sorbate, DBU-formate, DBU-octoate, DBU-oleate, DBU-o-phthalate, DBU-p-toluene-sulfonate, DBU-phenol resin salt and DBU-phenoate, which may be used either alone or in combination.

Examples of 1,5-diazabicyclo[4.3.0]nonene-5 salt (DBN salt) of the component (B) include DBN-naphthoate, DBN-sorbate, DBN-formate, DBN-octoate, DBN-oleate, DBN-o-phthalate, DBN-p-toluene-sulfonate, DBN-phenol resin salt and DBN-phenoate, which may be used either alone or in combination.

The proportion of DBU salts and the like (component (B)) is preferably 1 to 4 parts by weight (just abbreviated to "parts" hereinafter), particularly preferably 2 to 3 parts, based on 100 parts of the NBR-PVC (component (A)) in terms of interlaminar adhesion and rubber properties.

As the zeolite (component (C)), those represented by the following general formula (1) are used. Examples thereof include potassium-ion exchanged A-zeolite (K form A-zeolite), sodium-ion exchanged A-zeolite (Na form A-zeolite), calcium-ion exchanged A-zeolite (Ca form A-zeolite), magnesium-ion exchanged A-zeolite (Mg form A-zeolite), sodium-ion exchanged X-zeolite (Na form X-zeolite) and calcium-ion exchanged X-zeolite (Ca form X-zeolite), which may be used either alone or in combination. Among them, Na form A-zeolite is preferably used in terms of adhesion.

$$M_{x/n}[(AlO_2)_x(SiO_2)_y]\cdot zH_2O \qquad (1)$$

wherein M represents a metallic cation having an atomic valence of n, and x, y and z each represents a positive integer.

The proportion of the zeolite (component (C)) is preferably 5 to 20 parts based on 100 parts of the NBR-PVC (component (A)). When the proportion of the zeolite (component (C)) is less than 5 parts, interlaminar adhesion tends to deteriorate. When the proportion thereof is more than 20 parts, mechanical properties of the rubber tend to deteriorate.

The proportion of the magnesium oxide (component (D)) used together with the components (A) to (C) is preferably 3 to 20 parts, particularly preferably 5 to 15 parts, based on 100 parts of the NBR-PVC (component (A)) in terms of adhesion and mechanical properties.

Examples of the laminar mineral (component (E)) include talc, clay, mica and montmorillonite, which may be used either alone or in combination. Among them, talc is preferably used in terms of excellent adhesion.

The proportion of the laminar mineral (component (E)) is preferably 10 to 30 parts based on 100 parts of the NBR-PVC (component (A)) in terms of adhesion and mechanical properties.

Examples of the basic silica (component (F)) include those having pH of 9 to 12, which may be used either alone or in combination. Among them, those having a high pH are preferably used in terms of adhesion.

The proportion of the basic silica (component (F)) is preferably 10 to 30 parts based on 100 parts of the NBR-PVC (component (A)) in terms of adhesion.

The rubber composition may include zinc oxide (component (G)) as an optional component at less than 10 parts based on 100 parts of the NBR-PVC (component (A)) in terms of heat resistance of the fuel hose. When the proportion of the component (G) is over 10 parts, interlaminar adhesion deteriorates.

Each of the inner layer material and the outer layer material may appropriately include any of zinc oxide (component (G)), carbon black, lubricant (such as stearic acid), a flame retardant, a plasticizer, a vulcanizing agent (such as sulfur), a vulcanizing accelerator, a vulcanizing aid, an antioxidant, calcium carbonate or the like, as required, together with the above components (A) to (F).

As the material for forming the intermediate layer 2 (intermediate layer material) of the present invention, a material mainly composed of a tetrafluoroethylene-hexafluoropropylene-vinylidene fluoride terpolymer or a tetrafluoroethylene-hexafluoropropylene-vinylidene fluoride-perfluoroalkyl vinyl ether quaterpolymer is used. The tetrafluoroethylene-hexafluoropropylene-vinylidene fluoride-perfluoroalkyl vinyl ether quaterpolymer is more excellent than a tetrafluoroethylene-hexafluoropropylene-vinylidene fluoride terpolymer which does not copolymerize with perfluoroalkyl vinyl ether in terms of craze resistance and fuel permeation resistance.

In addition, the intermediate layer material may include any of carbon black, a lubricant (such as wax), a colorant or the like, as required, in addition to a tetrafluoroethylene-hexafluoropropylene-vinylidene fluoride terpolymer or a tetrafluoroethylene-hexafluoropropylene-vinylidene fluoride-perfluoroalkyl vinyl ether quaterpolymer.

A fuel hose according to another embodiment of the present invention includes a tubular inner layer 1 formed by a rubber composition essentially composed of acrylonitrile-butadiene rubber (NBR), an intermediate layer 2 formed by a material of which main component is the tetrafluoroethylene-hexafluoropropylene-vinylidene fluoride terpolymer or the tetrafluoroethylene-hexafluoropropylene-vinylidene fluoride-perfluoroalkyl vinyl ether quaterpolymer, and an outer layer 3 formed by a material of which essential components are the above-mentioned (A) to (F). In other words, the hose of this embodiment has the same structure as in the first embodiment as shown in the FIGURE except that the rubber composition of the inner layer material is replaced by the rubber composition of which essential component is acrylonitrile-butadiene rubber (NBR).

In the case where the rubber composition essentially composed of NBR is used as the inner layer material, the inner layer material may appropriately include any of carbon black, lubricant (such as stearic acid), zinc oxide, a plasticizer, a vulcanizing agent (such as sulfur), a vulcanizing accelerator, a vulcanizing aid, an antioxidant, a filler (such as calcium carbonate) or the like, as required, in addition to NBR. The inner layer material may include the above components (B) to (F).

The fuel hose of the present invention is produced, for example, by the following manner. Namely, the inner layer material, the intermediate layer material and the outer layer material are each prepared. These materials are continuously extruded by means of an extruder for forming a hose having an inner layer 1, an intermediate layer 2 formed on an outer peripheral surface of the inner layer and an outer layer 3 formed on an outer peripheral surface of the intermediate layer (as shown in FIGURE). In the fuel hose of the present invention, each interface is strongly adhered without use of adhesive in vulcanization of the hose so as to be integrally laminated.

The method of producing the fuel hose of the present invention is not limited to the above-mentioned manner. The fuel hose may be produced, for example, by extruding the inner layer material by an extruder for forming a single-layer structure, and then the intermediate layer material and the outer layer material are successively extruded in this order by each extruder for forming a three-layer structure. Each interface is generally adhered without use of adhesive. However, adhesive may be used supplementarily according to the case. Further, reinforcing fibers (such as polyester, vinylon, aramid and nylon) may be provided therebetween, as required.

In the fuel hose of the present invention, the inner layer 1 generally has a thickness of 0.2 to 4 mm, preferably 0.5 to 2 mm, and the intermediate layer 2 generally has a thickness of 0.02 to 1 mm, preferably 0.05 to 0.5 mm, and the outer layer 3 generally has a thickness of 0.2 to 4 mm, preferably 0.5 to 2 mm. The fuel hose of the present invention generally has an inner diameter of 2 to 50 mm, preferably 5 to 35 mm.

The fuel hose of the present invention is not limited to a three-layered structure, as shown in FIGURE. For example, the fuel hose of the present invention may include a rubber layer (innermost layer) provided on an inner peripheral surface of the inner layer 1 or a rubber layer (outermost layer) composed of chlorosulfonated polyethylene rubber (CSM) provided on an outer peripheral surface of the outer layer 3. Further, a coating layer such as rubber cement is formed on a distal end or over the whole length of the fuel hose.

Next, an explanation will be given to Examples and Comparative Examples. It should be noted that the present invention is not limited to the Examples.

Prior to preparation of the Examples and the Comparative Examples, the materials for NBR-PVC and NBR were prepared as follows.

Preparation of NBR-PVC Material and NBR Material

Each material was blended at each ratio as shown in the following Tables 1 and 2 and kneaded by a Banbury mixer and a roll for preparation of NBR-PVC material and NBR material.

TABLE 1

|  | NBR-PVC material (parts by weight) | | | | | | | | |
| --- | --- | --- | --- | --- | --- | --- | --- | --- | --- |
|  | A | B | C | D | E | F | G | H | I |
| NBR-PVC *1 | 100 | 100 | 100 | 100 | 100 | 100 | 100 | 100 | 100 |
| NBR *2 | — | — | — | — | — | — | — | — | — |
| Stearic acid *3 | 1 | 1 | 1 | 1 | 1 | 1 | 1 | 1 | 1 |
| ZnO *4 | — | — | — | — | — | — | — | — | 0.09 |
| MgO *5 | 3 | 20 | 10 | 10 | 10 | 10 | 10 | 10 | 10 |
| DBU salt *6 | 2 | 2 | 2 | 2 | 2 | 2 | 2 | 2 | 2 |
| Carbon black *7 | 30 | 30 | 30 | 30 | 30 | 30 | 30 | 30 | 30 |
| Zeolite *8 | 10 | 10 | 5 | 20 | 10 | 10 | 10 | 10 | 10 |
| Talc *9 | 20 | 20 | 20 | 20 | 10 | 30 | 20 | 20 | 20 |
| Basic silica *10 | 15 | 15 | 15 | 15 | 15 | 15 | 10 | 30 | 15 |
| Ether ester plasticizer *11 | 25 | 25 | 25 | 25 | 25 | 25 | 25 | 25 | 25 |

TABLE 1-continued

| | NBR-PVC material | | | | | | | | (parts by weight) |
|---|---|---|---|---|---|---|---|---|---|
| | A | B | C | D | E | F | G | H | I |
| Sulfur *12 | 1 | 1 | 1 | 1 | 1 | 1 | 1 | 1 | 1 |
| Vulcanizing accelerator (OBS) *13 | 1 | 1 | 1 | 1 | 1 | 1 | 1 | 1 | 1 |

TABLE 2

| | NBR-PVC material | | | | | | | | (parts by weight) NBR |
|---|---|---|---|---|---|---|---|---|---|
| | J | K | L | M | a | b | c | d | material X |
| NBR-PVC *1 | 100 | 100 | 100 | 100 | 100 | 100 | 100 | 100 | — |
| NBR *2 | — | — | — | — | — | — | — | — | 100 |
| Stearic acid *3 | 1 | 1 | 1 | 1 | 1 | 1 | 1 | 1 | 1 |
| ZnO *4 | — | 3 | 5 | 10 | 5 | — | — | — | — |
| MgO *5 | 10 | 10 | 10 | 10 | — | 10 | 10 | 10 | 10 |
| DBU salt *6 | 2 | 2 | 2 | 2 | 2 | 2 | 2 | 2 | 1 |
| Carbon black *7 | 30 | 30 | 30 | 30 | 60 | 30 | 30 | 30 | 50 |
| Zeolite *8 | 10 | 10 | 10 | 10 | — | — | 10 | 10 | — |
| Talc *9 | 20 | 20 | 20 | 20 | — | 20 | 20 | — | 25 |
| Basic silica *10 | 15 | 15 | 15 | 15 | — | 15 | — | 15 | 20 |
| Ether ester plasticizer *11 | 25 | 25 | 25 | 25 | 25 | 25 | 25 | 25 | 25 |
| Sulfur *12 | 1 | 1 | 1 | 1 | 1 | 1 | 1 | 1 | 1.5 |
| Vulcanizing accelerator (OBS) *13 | 1 | 1 | 1 | 1 | 1 | 1 | 1 | 1 | 1 |

The materials shown in the Tables 1 and 2 are described as follows.

NBR-PVC*1
  NIPOL 1203JNS(NBR/PVC-70/30(weight ratio), AN amount: 33.5) available from ZEON CORPORATION
NPR*2
  NIPOL DN101 (AN amount: 42.5) available from ZEON CORPORATION
Stearic Acid*3
  LUNAC S30 available from Kao Corporation
ZnO*4
  ZINC OXIDE II available from Mitsui Mining & Smelting Co., Ltd.
MgO*5
  KYOWA MAG #150 available from Kyowa Chemical Industry Co., Ltd.
DBU Salt*6
  DBU-naphthoate
Carbon Black*7
  SRF (Semi Reinforcing Furnace) carbon black (SEAST S available from Tokai Carbon Co., Ltd.)
Zeolite*8
  MIZUKALIZER DS available from MIZUSAWA INDUSTRIAL CHEMICALS, LTD
Talc*9
  MISTRON VAPOR TALC available from Nihon Mistron Co., Ltd.
Basic Silica*10
  CARPLEX 1120 available from DSL Japan Co., Ltd.
Ether Ester Plasticizer*11
  ADK CIZER RS-107 available from ADEKA CORPORATION
Sulfur*12
  GOLDEN FLOWER SULFUR POWDER available from Tsurumi Kagaku K. K.
Thiazole Vulcanizing Accelerator (OBS)*13
  N-oxydiethylene-2-benzothiazolyl sulfenamide (OBS) (NOCCELER MSA-G available from OUCHI SHINKO CHEMICAL INDUSTRIAL CO., LTD.)

EXAMPLES 1 TO 11, 13 TO 16 AND COMPARATIVE EXAMPLES 1 TO 4

Each layer material was prepared in the above-mentioned manner. The materials of each combination shown in the following Tables 3 to 5 were successively extruded by means of an extruder for forming a three-layered fuel hose (inner diameter: 24 mm) having an inner layer (thickness: 2 mm), an intermediate layer (thickness: 0.1 mm) formed on an outer peripheral surface of the inner layer, and an outer layer (thickness: 2 mm) formed on an outer peripheral surface of the intermediate layer.

EXAMPLE 12

Preparation of Outer Layer Material
  An outer layer material (CSM material) was prepared by blending 100 parts of chlorosulfonated polyethylene rubber (CSM) (HYPALON 40 available from DuPont Performance Elastomers), 10 parts of titanium oxide, 90 parts of calcium carbonate, 5 parts of SRF (Semi Reinforcing Furnace) carbon black (SEAST S available from Tokai Carbon Co., Ltd.), 5 parts of MgO (KYOWA MAG #150 available from Kyowa Chemical Industry Co., Ltd.), 3 parts of pentaerythritol, 25 parts of dioctyl sebacate, a part of NOCLAC NBC available from OUCHI SHINKO CHEMICAL INDUSTRIAL CO., LTD., and 2 parts of NOCCELER TRA available from OUCHI SHINKO CHEMICAL INDUSTRIAL CO., LTD., and kneading the resulting mixture by means of Banbury mixer and a roll.

Production of Fuel Hose
  Each layer material was prepared in the above-mentioned manner. These materials are continuously extruded by means of an extruder for forming a four-layered fuel hose (inner diameter: 24 mm) having an inner layer (thickness: 2 mm), an intermediate layer (thickness: 0.1 mm) formed on an outer peripheral surface of the inner layer, an outer layer (thickness: 0.5 mm) formed on an outer peripheral surface of the intermediate layer and an outermost layer (thickness: 1.5 mm) formed on an outer peripheral surface of the outer layer.

TABLE 3

| | EXAMPLE | | | | | | | |
|---|---|---|---|---|---|---|---|---|
| | 1 | 2 | 3 | 4 | 5 | 6 | 7 | 8 |
| Inner layer | NBR-PVC material A | NBR-PVC material A | NBR-PVC material B | NBR-PVC material C | NBR-PVC material D | NBR-PVC material E | NBR-PVC material F | NBR-PVC material G |
| Intermediate layer | Fluoro-resin A | Fluoro-resin B | Fluoro-resin A | Fluoro-resin A | Fluoro-resin A | Fluoro-resin A | Fluoro-resin A | Fluoro-resin A |
| Outer layer | NBR-PVC material A | NBR-PVC material A | NBR-PVC material B | NBR-PVC material C | NBR-PVC material D | NBR-PVC material E | NBR-PVC material F | NBR-PVC material G |
| Interlaminar adhesion | ○ | ○ | ○ | ○ | ○ | ○ | ○ | ○ |
| Change rate of elongation after heat aging | | | | | | | | |
| 100° C. × 72 H | −30 | −30 | −29 | −30 | −31 | −28 | −32 | −29 |
| 100° C. × 168 H | −57 | −57 | −59 | −60 | −62 | −56 | −60 | −57 |
| 120° C. × 72 H | −73 | −73 | −75 | −74 | −75 | −72 | −77 | −72 |

* Fluoro-resin A [a tetrafluoroethylene-hexafluoropropylene-vinylidene fluoride-perfluoroalkyl vinyl ether quaternary polymer (THV815G available from Dyneon GmbH)]
* Fluoro-resin B [a tetrafluoroethylene-hexafluoropropylene-vinylidene fluoride ternary polymer (THV500G available from Dyneon GmbH)]

TABLE 4

| | EXAMPLE | | | | | | | |
|---|---|---|---|---|---|---|---|---|
| | 9 | 10 | 11 | 12 | 13 | 14 | 15 | 16 |
| Inner layer | NBR-PVC material H | NBR-PVC material I | NBR material X | NBR-PVC material A | NBR-PVC material J | NBR-PVC material K | NBR-PVC material L | NBR-PVC material M |
| Intermediate layer | Fluoro-resin A | Fluoro-resin A | Fluoro-resin A | Fluoro-resin A | Fluoro-resin A | Fluoro-resin A | Fluoro-resin A | Fluoro-resin A |
| Outer layer | NBR-PVC material H | NBR-PVC material I | NBR-PVC material A | NBR-PVC material A | NBR-PVC material J | NBR-PVC material K | NBR-PVC material L | NBR-PVC material M |
| Outermost layer | — | — | — | CSM material | — | — | — | — |
| Interlaminar adhesion | ○ | ○ | ○ | ○ | ○ | ○ | ○ | ○ |
| Change rate of elongation after heat aging | | | | | | | | |
| 100° C. × 72 H | −31 | −26 | −31 | −32 | −29 | −17 | −23 | −23 |
| 100° C. × 168 H | −60 | −50 | −56 | −59 | −58 | −24 | −32 | −29 |
| 120° C. × 72 H | −78 | −70 | −75 | −74 | −74 | −52 | −55 | −55 |

* Fluoro-resin A [a tetrafluoroethylene-hexafluoropropylene-vinylidene fluoride-perfluoroalkyl vinyl ether quaternary polymer (THV815G available from Dyneon GmbH)]

TABLE 5

| | COMPARATIVE EXAMPLE | | | |
|---|---|---|---|---|
| | 1 | 2 | 3 | 4 |
| Inner layer | NBR material X | NBR material X | NBR material X | NBR material X |
| Intermediate layer | Fluoro-resin A | Fluoro-resin A | Fluoro-resin A | Fluoro-resin A |
| Outer layer | NBR-PVC material a | NBR-PVC material b | NBR-PVC material c | NBR-PVC material d |
| Outermost layer | — | — | — | — |
| Interlaminar adhesion | X | X | X | X |
| Change rate of elongation after heat aging | | | | |
| 100° C. × 72 H | −15 | −28 | −32 | −30 |
| 100° C. × 168 H | −22 | −57 | −60 | −58 |
| 120° C. × 72 H | −49 | −73 | −77 | −75 |

* Fluoro-resin A [a tetrafluoroethylene-hexafluoropropylene-vinylidene fluoride-perfluoroalkyl vinyl ether quaternary polymer (THV815G available from Dyneon GmbH)]

Each peeling mode and change rate of elongation after heat aging of the fuel hoses of Examples and Comparative Examples were evaluated in the following manner. The results are also shown in the above Tables 3 to 5.

Peeling Mode (Interlaminar Adhesion)

Each specimen having 25.4 mm width was cut out of each hose. The outer layer of each specimen was peeled from the remaining layers at a rate of 50 mm/min by means of a tensile tester in accordance with JIS (Japanese Industrial Standards) B 7721. Each peeling mode was visually observed at that time. In evaluation, a symbol ○ indicates that rubber of the outer layer was broken, while a symbol X indicates that the interface between the outer layer and the intermediate layer was broken.

Change Rate of Elongation after Heat Aging

The change rate of elongation of the outer layer material was measured by using each fuel hose after heat aging of 100° C.×72 hours, 100° C.×168 hours and 120° C.×72 hours, respectively.

As can be understood from the results of Tables 3 to 5, the fuel hoses of the Examples were each good at peeling mode. In the Examples 10 and 14 to 16 where NBR-PVC materials I, K, L and M containing ZnO were used, respectively, change rates of elongation after heat aging were smaller than those of the fuel hoses excluding ZnO, and thus showed improved heat resistance.

On the other hand, in the fuel hose of Comparative Example 1 which used the material, excluding zeolite, talc and basic silica, interfacial peeling was occurred. In the fuel hose of Comparative Example 2 which used the material excluding zeolite, interfacial peeling was occurred. In the fuel hose of Comparative Example 3 which used the material excluding basic silica, interfacial peeling was occurred. In the fuel hose of Comparative Example 4 which used the material excluding talc, interfacial peeling was occurred.

The fuel hose of the present invention is preferably used as an automotive fuel hose, however, it may be also used a as fuel hose for a tractor, a cultivator, a boat, a ship and the like.

What is claimed is:

1. A fuel hose comprising a laminated structure of a tubular resin layer and an adjoining rubber layer, the rubber layer being formed by a rubber composition containing the following (A) to (F) as essential components, and the resin layer being formed by a resin material containing a tetrafluoroethylene-hexafluoropropylene-vinylidene fluoride-perfluoroalkyl vinyl ether quaternarypolymer as a main component:

(A) a blend of acrylonitrile-butadiene rubber and polyvinyl chloride;
(B) at least one selected from the group consisting of 1,8-diazabicyclo [5.4.0] undecene-7 salt, 1,5-diazabicyclo [4.3.0] nonene-5 salt, 1,8-diazabicyclo [5.4.0] undecene-7 and 1,5-diazabicyclo [4.3.0] nonene-5;
(C) zeolite;
(D) magnesium oxide;
(E) laminar mineral; and
(F) basic silica.

2. A fuel hose as set forth in claim 1, wherein the component (B) is present at 1 to 4 parts by weight, component (C) is present at 5 to 20 parts by weight, component (D) is present at 3 to 20 parts by weight, component (E) is present at 10 to 30 parts by weight, component (F) is present at 10 to 30 parts by weight, respectively, based on 100 parts by weight of the component (A).

3. A fuel hose comprising a tubular inner layer, an intermediate layer formed on an outer peripheral surface of the inner layer and an outer layer formed on an outer peripheral surface of the intermediate layer, the inner layer and the outer layer being formed by a rubber composition containing the following (A) to (F) as essential components, the intermediate layer being formed by a resin material containing a tetrafluoroethylene-hexafluoropropylene-vinylidene fluoride-perfluoroalkyl vinyl ether quaternarypolymer as a main component:

(A) a blend of acrylonitrile-butadiene rubber and polyvinyl chloride;
(B) at least one selected from the group consisting of 1,8-diazabicyclo [5.4.0] undecene-7 salt, 1,5-diazabicyclo [4.3.0] nonene-5 salt, 1,8-diazabicyclo [5.4.0] undecene-7 and 1,5-diazabicyclo [4.3.0] nonene-5;
(C) zeolite;
(D) magnesium oxide;
(E) laminar mineral; and
(F) basic silica.

4. A fuel hose comprising a tubular inner layer, an intermediate layer formed on an outer peripheral surface of the inner layer and an outer layer formed on an outer peripheral surface of the intermediate layer, the inner layer being formed by a rubber material containing acrylonitrile-butadiene rubber as an essential component, the intermediate layer being formed by a resin material containing a tetrafluoroethylene-hexafluoropropylene-vinylidene fluoride-perfluoroalkyl vinyl ether quaternarypolymer as a main component, and the outer layer being formed by a rubber composition containing the following (A) to (F) as essential components:

(A) a blend of acrylonitrile-butadiene rubber and polyvinyl chloride;
(B) at least one selected from the group consisting of 1,8-diazabicyclo [5.4.0] undecene-7 salt, 1,5-diazabicyclo [4.3.0] nonene-5 salt, 1,8-diazabicyclo [5.4.0] undecene-7 and 1,5-diazabicyclo [4.3.0] nonene-5;
(C) zeolite;
(D) magnesium oxide;
(E) laminar mineral; and
(F) basic silica.

5. A fuel hose as set forth in claim 1, wherein the rubber composition containing the above-mentioned (A) to (F) as essential components further contains the following (G) at not more than 10 parts by weight based on 100 parts by weight of the above-mentioned (A):

(G) zinc oxide.

* * * * *